Nov. 17, 1964    J. HOCHBERG    3,157,723
PROCESS AND APPARATUS FOR EMBOSSING SHEET MATERIAL
Filed July 5, 1961    2 Sheets-Sheet 1

INVENTOR
JEROME HOCHBERG

BY *P. J. Poindexter*
AGENT

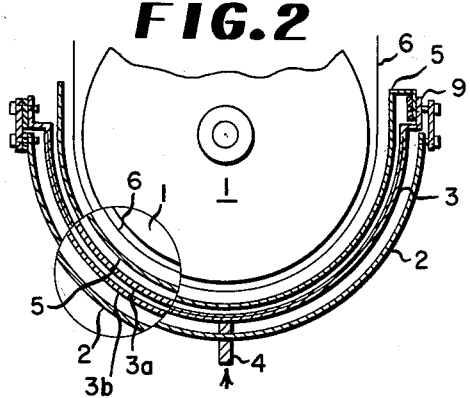
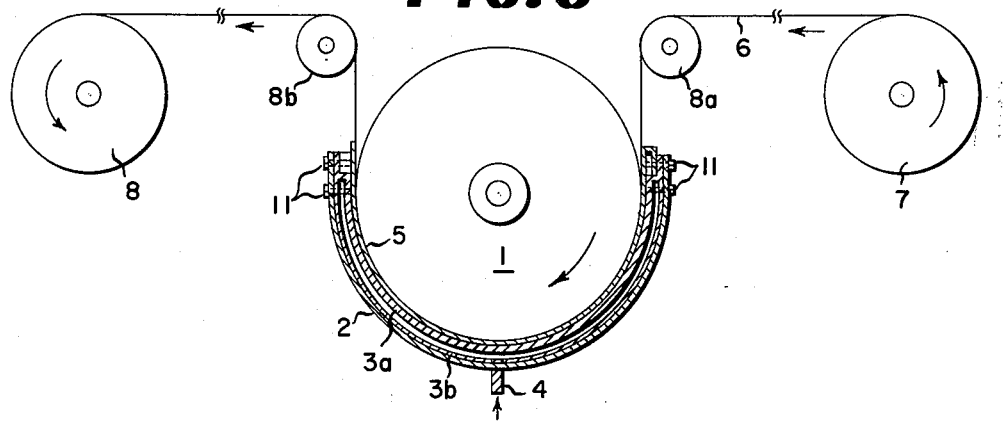
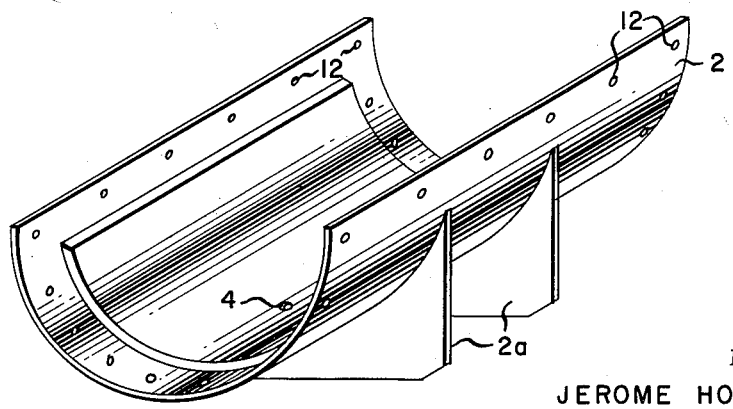
INVENTOR
JEROME HOCHBERG

United States Patent Office 3,157,723
Patented Nov. 17, 1964

3,157,723
PROCESS AND APPARATUS FOR EMBOSSING SHEET MATERIAL
Jerome Hochberg, Newburgh, N.Y., assignor to E. I. du Pont de Nemours and Company, Wilmington, Del., a corporation of Delaware
Filed July 5, 1961, Ser. No. 121,996
8 Claims. (Cl. 264—284)

This invention relates to the treating of plastic sheet materials and apparatus therefor; and particularly to an apparatus and process for treating such materials to emboss, polish, cure and/or laminate them.

Various methods and apparatus have been widely used to impart pressure treatments to plastic sheet materials. For example, pressure plates or rolls, one of which has a design engraved on its surface, have been used extensively for the embossing of plastic sheet materials. Also, smooth rolls and plates have been used to polish such sheets. An apparatus known as "Rotocure" is shown in U.S. Patents 1,956,545 and 2,039,258, 2,039,271, Reissue 19,660 and Reissue 20,037, which teach a continuous method of applying pressure for an extended length of time to plastic sheet material involving a steel band and heated drum having a highly polished surface. More recently U.S. Patent 2,970,345 teaches a continuous method for embossing and venting resin coated fabrics which uses a wire belt in conjunction with a steel band and a heated drum.

The object of this invention is the provision of a method and apparatus for applying heat and uniform fluid pressure to sheet materials. A more specific object is the provision of a continuous method and apparatus for embossing, perforating, laminating or polishing heat moldable sheet material which involves a fluid pressure and a prolonged dwell time. A still more specific object is the provision of a continuous method and apparatus for curing, under fluid pressure, heat convertible sheet materials.

The apparatus of this invention comprises a movable rigid or non-yielding member which forms a nip of extended length and width with a yieldable stationary inflatable enclosure supported by a rigid stationary restraining member. The movable non-yielding member can be in the form of a roller or belt. The roller or belt can be either smooth or have a configuration on the surface thereof. The belt can be in the form of flat metal sheet or woven wire.

In a preferred form of the invention, a stationary slip sheet of material having a low coefficient of frictoin is disposed between the movable rigid member and the inflatable stationary enclosure forming the nip of extended length and width with the movable rigid member. In carrying out the preferred form of this invention, the material to be given a heat and pressure treatment is passed between the moving rigid member and the stationary slip sheet which is supported by the inflated enclosure, which is, in turn, supported by the rigid stationary restraining member. The slip sheet is preferably high tensile strength fabric coated on at least one side with an unctuous fluorocarbon resin, such as polymers and copolymers of tetrafluoroethylene, monochlorotrifluoroethylene, and vinylidene fluoride.

This invention can be carried out without the slip sheet in which case solid or liquid lubricants are useful between the material being given the heat and pressure treatment and the inflated enclosure. Useful solid lubricants include mica, graphite, or talc and liquid lubricants include oils, water and other liquids innocuous to the material being treated and the material forming the yieldable inflated enclosure.

The movable non-yielding member can have either a smooth or patterned surface. The inflated enclosure forming a nip of extended length and width with the nonyielding member is preferably formed of a high strength fabric coated on each side with an impermeable layer.

In a modification of the preferred embodiment of the invention, the movable non-yielding member can be an endless steel belt, such as is used in the Rotocure apparatus referred to above or a wire belt which passes around the guide rolls which are forced apart from each other to hold the belt taut to provide a substantially non-yielding surface. Since the inflated enclosure has a flexible surface which is forced against the non-yielding member by the fluid which is under pressure within the enclosure, uniform pressure will be applied to the material while passing through the nip formed by the movable member and the stationary enclosure.

The principles and practice of this invention will be best understood from the following detailed description of the following embodiment selected for the purpose of illustrating the best mode contemplated and referring to the accompanying drawings in which:

FIGURE 1 is a perspective view of the apparatus with parts broken away to show the relative position and relation of the various members.

FIGURE 2 is an end view with a portion enlarged showing the relative position of the movable non-yielding roller 1, material being processed 6, slip sheet 5, both sides of the inflatable envelope 3a and 3b, rigid restraining member 2 and the fluid port 4 equipped with a valve (not shown in the drawing) before the various members are brought in pressure contact with each other.

FIGURE 3 is an end view similar to FIGURE 2 showing the unbatch and batch-up and the relative positions of the varoius elements in pressure contact while the apparatus is in operation.

FIGURE 4 is a perspective view of the rigid restraining member 2.

Figure 1:
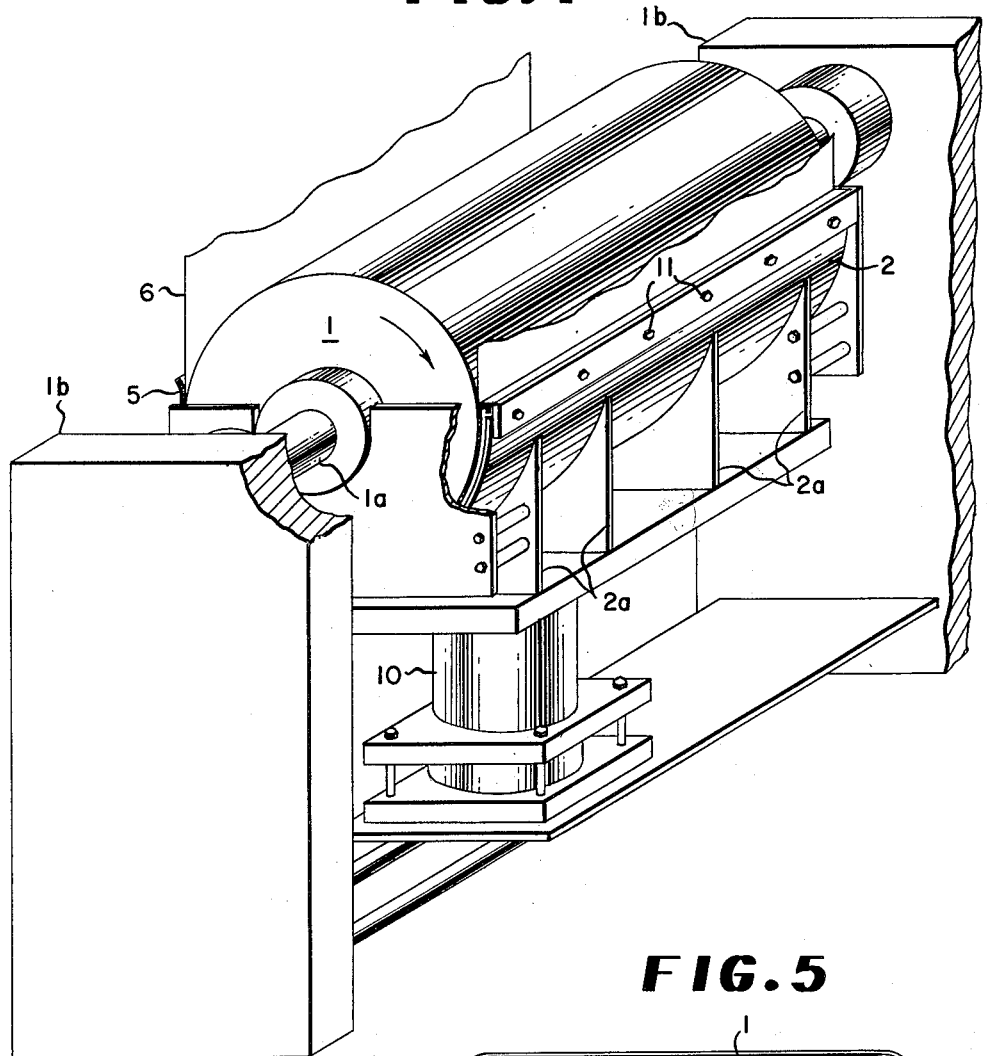
Figure 5:
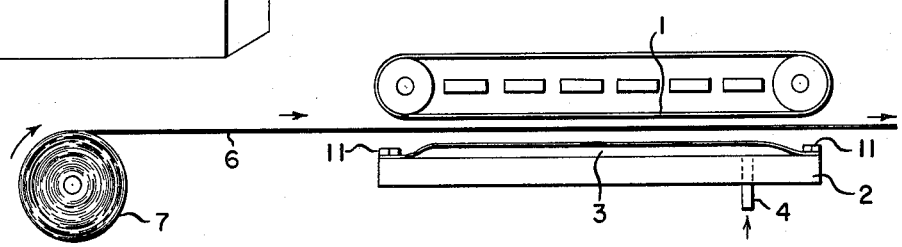

FIGURE 5 is an end view of a modification of the invention showing the relative positions of the various elements wherein the movable non-yielding member 1 is in the form of a belt and the stationary inflatable enclosure 3 is supported by a flat bed 2.

The preferred apparatus for carrying out this invention comprises an embossing roller 1 mounted on an axis 1a supported by a frame 1b and inflated enclosure 3 supported by a rigid restraining shoe 2 mounted juxtaposed a portion of the peripheral surface of the embossing roller 1. The restraining shoe 2 is supported by struts 2a which are in turn supported by a hydraulic ram 10. In the preferred embodiment, to provide easy mounting and dismounting of the shoe 2, the restraining shoe 2 encompasses about one half of the peripheral surface of the embossing roller 1; although it can encompass as much as 90% of the peripheral surface of the embossing roller 1, in which case the apparatus is assembled in the manner of inserting one cylinder inside another.

Located between the embossing roller 1 and rigid restraining shoe 2, is an inflatable flexible envelope 3, having side members 3a and 3b, comprising a synthetic rubber coated fabric. The outer edges of envelope 3 is fastened to the restraining member 2 by means of bolts 11 in openings 12. As shown in FIGURE 4, the marginal edges of the restraining member 2 are recessed to provide a clearance for the nuts on bolts 11 holding the envelope 3 in place. The envelope 3 has a fluid port 4 equipped with a valve (not shown in the drawing) for introducing therein a fluid as a pressure transmitting means. The fluid is preferably air although liquids such as water, oils, etc., can also be used to inflate the envelope 3 and serve as the pressure transmitting means. In the particularly preferred embodiment of this invention, a slip sheet of fluorocarbon polymer coated glass fabric, such as polytetrafluoroethylene coated glass fabric 5 is mounted between the embossing roller 1 and the inflated envelope 3. It is only necessary to fasten the slip sheet 5 at the entry end of the nip as shown at 9 in FIGURE 2. The fluorocarbon polymer coated glass fabric provides a low friction surface.

A heat moldable sheet material 6 to be given a heat and/or pressure treatment is unwound from the unbatch 7 and passed over guide roll 8a through the nip formed by the embossing roller 1 and the restraining shoe 2 and over guide roll 8b to wind-up 8. There is interposed between the restraining shoe 2 and the heat moldable sheet material 6 an inflated envelope 3. In the particularly preferred embodiment the slip sheet having very low coefficient of friction is interposed between the inflated envelope 3 and the heat moldable sheet material 6. A polytetrafluoroethylene coated fabric which has a low coefficient of friction has been found to be particularly well suited for the slip sheet 5. A cotton duck fabric heavily coated on each side with an impermeable synthetic rubber composition has been found to be particularly suited for use in constructing the inflated envelope 3. The envelope 3 is preferably inflated with air introduced through the port 4. The pressure inside the envelope is about ten to fifteen pounds per square inch which forces the heat moldable sheet material 6 against the embossing roller 1 as the result of the rigid restraining shoe 2 being forced against the envelope 3 by means of the hydraulic ram 10. The process and apparatus is operable when the pressure inside the envelope 3 is as low as ½ p.s.i. There is no particular upper limit for the pressure inside the envelope, which can be as high as 20 p.s.i. or higher. The restraining shoe 2 acts to limit the expansion of the inflated envelope 3. In a modification of the preferred embodiment, the restraining shoe 2 can serve as the outermost side of the envelope 3, as illustrated in FIGURE 5.

During operation of the apparatus and process, the restraining member 2 and the embossing element 1 are mounted so as to form a fixed clearance therebetween.

The inflated envelope 3 can be in sections or compartments so that different temperature fluids can be introduced into the compartments, i.e., first section hot, second section cold, in order to freeze the embossed surface before it is separated from the embossing element.

It is also possible to use a polished flexible metal sheet, such as aluminum foil, between the slip sheet 5 and the inflated envelope 3 or in place of the slip sheet 5 to protect the envelope 3 from becoming punctured due to excess abrasion. When a flexible metal sheet is used as the slip sheet, it is possible to apply a polish to the side of the moldable sheet material 6 being treated which contacts the stationary flexible metal sheet and emboss the opposite side, which contacts the movable non-yielding member 1 having a configuration on its surface.

Another modification of the apparatus of this invention involves the use of a pressurized envelope 3 which moves along with the material 6 being treated in the manner of a continuous belt. In this modification thus there is no relative movement of the top side 3a of the envelope 3 contacting the material 6 being treated. The slip sheet 5 is then positioned between the bottom side 3b of envelope 3 and the restraining shoe 2 to reduce the friction therebetween.

The envelope 3 can be a continuous length of an impermeable tube which is batched on a reel and is fed into the nip of the apparatus and then as it emerges from the nip it is batched on another reel. In this modification, pairs of squeeze rolls at the entrance and exit of the nip are provided to confine the fluid under pressure within that portion of the tube passing through the extended nip. The restraining means 2 for the inflated tube can be either a stationary shoe as illustrated in FIGURES 1, 2, 3, and 4, or a bed of closely spaced rollers juxtaposed the movable non-yielding member 1.

The fluid introduced into the envelope 3 can be heated or cooled. In order to cool the inflated envelope 3 and slip sheet 5 to reduce friction and prolong the life of the envelope 3 and slip sheet 5, the fluid introduced into the envelope 3 can be recirculated to control the temperature thereof.

The sheet materials which can be processed in accordance with this invention include the heat moldable sheet materials, such as those which comprise thermoplastic resins as film formers, including polyvinyl chloride, copolymers of vinyl chloride and other ethylenically unsaturated monomers copolymerizable therewith, nylon and other thermoplastic polyamides, cellulose derivatives, such as cellulose nitrate, cellulose acetate and cellulose acetobutyrate, polyurethanes, such as the reaction products of a polyether glycol or hydroxyl terminated polyester and a diisocyanate and mixtures of thermoplastic resins. The heat moldable sheet materials can be either in the form of an unsupported film, fabric or as a coating on a flexible substrate such as paper, fabric or metal.

The method and apparatus of this invention is particularly useful for embossing leather-like sheet materials involving a heat moldable polyurethane coating on a fabric substrate, such as described in copending application S.N. 636,481, filed January 28, 1957 by Johnston et al., now Patent No. 3,000,757.

The method and apparatus of this invention is also useful in curing heat convertible coatings, such as synthetic and natural rubber unsupported films or coated substrates, heat convertible resins, such as urea/aldehyde, melamine/aldehyde and phenol/aldehyde resins.

An important advantage of this invention is that it provides a continuous process having an extended dwell time for the heat and pressure treatment by means of simplified and inexpensive apparatus. Another advantage is very accurate control of pressures, especially in the low pressure ranges, such as ½ to 20 p.s.i. or higher.

A still further advantage is the application of uniform pressure throughout the pressure zone, thus compensating for any eccentricities in embossing member 1 and/or restraining member 2.

The process and apparatus of this invention has the ability to emboss sheet materials having a wide range of thicknesses.

For those materials which do not have sufficient shear strength to resist the shear stresses set up by the friction created between the stationary slip sheet and the back of the heat moldable material being treated, a moving continuous interleaf traveling at the same rate as the surface of the embossing cylinder is introduced between the back of the material being treated and the surface of the slip sheet. For this purpose a glass fabric coated on one side only with polytetrafluoroethylene is particularly useful in which the uncoated side of the glass fabric is next to the material being given the heat and pressure treatment and the polytetrafluoroethylene is next to the inflated envelope.

I claim:

1. An apparatus for applying a fluid pressure uniformly over the surface of sheet material comprising a rotatable non-yielding member having an embossing surface and which forms a nip of extended length and width with a rubbery, conformable, non-rotatable and inflatable enclosure supported by a non-rotatable rigid restraining member, a slip-sheet being disposed between the embossing surface and the inflatable enclosure.

2. The apparatus of claim 1 in which the rotatable non-yielding member is in the form of a belt.

3. The apparatus of claim 1 in which the rotatable non-yielding member is in the form of a roller.

4. The apparatus of claim 3 in which the inflatable enclosure is an impermeable envelope.

5. The apparatus of claim 3 in which the rigid restraining member forms one side of the inflatable enclosure.

6. The apparatus of claim 3 in which the slip-sheet is a glass fabric coated with an unctuous fluorocarbon resin.

7. A method for embossing by applying heat and pressure uniformly over the surface of a heat moldable sheet material in contact with an embossing member which comprises passing said sheet material through an extended nip formed by a moldable heated rigid embossing member and a rubbery inflated enclosure readily conformable with said movable embossing member and supported by a non-rigid restraining member, a slip-sheet being disposed between the sheet material being embossed and the inflated enclosure.

8. The method of claim 7 in which the slip-sheet is a glass fabric coated with an unctuous fluorocarbon resin.

References Cited in the file of this patent

UNITED STATES PATENTS

| | | |
|---|---|---|
| 623,648 | Behnisch | Apr. 25, 1899 |
| 2,074,410 | Matthews | Mar. 23, 1937 |
| 2,080,084 | Matthews | May 11, 1937 |
| 2,135,763 | Nicholson | Nov. 8, 1938 |
| 2,144,793 | Christensen | Jan. 24, 1939 |
| 2,585,915 | Chavannes | Feb. 19, 1952 |
| 2,838,796 | Reed | June 17, 1958 |

UNITED STATES PATENT OFFICE
CERTIFICATE OF CORRECTION

Patent No. 3,157,723                          November 17, 1964

Jerome Hochberg

It is hereby certified that error appears in the above numbered patent requiring correction and that the said Letters Patent should read as corrected below.

Column 1, line 50, for "frictoin" read -- friction --; column 3, line 67, for "equeeze" read -- squeeze --; column 5, line 4, for "moldable" read -- movable --.

Signed and sealed this 30th day of March 1965.

(SEAL)
Attest:

ERNEST W. SWIDER                          EDWARD J. BRENNER
Attesting Officer                           Commissioner of Patents